United States Patent [19]

Kalish

[11] 3,944,832

[45] Mar. 16, 1976

[54] SCINTILLATION SPECTROMETER

[76] Inventor: Yehoshua Kalish, 98 Tzahal Str., Kiron, Israel

[22] Filed: Feb. 28, 1974

[21] Appl. No.: 446,777

[52] U.S. Cl. .............. 250/361; 250/328; 250/367; 250/369
[51] Int. Cl. ............................................. G01t 1/20
[58] Field of Search .......... 250/361, 328, 363, 367, 250/368, 369

[56] References Cited
UNITED STATES PATENTS

| | | | |
|---|---|---|---|
| 3,127,512 | 3/1964 | Monaghan | 250/363 |
| 3,488,497 | 1/1970 | Utting | 250/328 |
| 3,796,879 | 3/1974 | Obrycki | 250/363 |

*Primary Examiner*—Archie R. Borchelt
*Attorney, Agent, or Firm*—Finnegan, Henderson, Farabow & Garrett

[57] ABSTRACT

Disclosed herein is a scintillation spectrometer comprising an inorganic scintillation crystal said crystal being characterized by a well situated therein wherein the inner surfaces of said well are coated with a light transmitting material whereby said spectrometer is adapted to measure both beta and gamma emissions of radioactive samples introduced into said well.

11 Claims, 5 Drawing Figures

SCINTILLATION SPECTROMETER

BACKGROUND OF THE INVENTION

1. Field of the Invention

The present invention concerns scintillation spectrometers. More particularly the present invention is directed to scintillation counters comprising an inorganic scintillation crystal adapted to measure both beta and gamma emissions of radioactive samples.

2. Description of the Prior Art

There are two major types of scintillation equipment in use today. The first is what is commonly classified as a well-type gamma scintillation spectrometer and the second is the liquid scintillation spectrometer for counting beta emitting samples.

When ionizing radiation is absorbed by a suitable scintillator photons are emitted. These light photons can be detected by a photomultiplier tube which is a sensitive device for detecting a light pulse and coverting it into an electrical pulse.

The type of scintillator used depends on whether beta or gamma radiation is to be detected. For gamma radiation detection sodium iodide crystals activated with thallium are usually used. The presence of the relatively high atomic iodine ensures good absorption of gamma radiation in the crystal, which is also transparent to the fluorescent light emitted. Sodium iodide is hygroscopic so that it needs to be protected from the atmosphere. The crystal is usually encased in a thin aluminium alloy can, with an intermediate layer of a diffuse reflector to improve the efficiency of light collection. The base of the scintillation crystal which is not covered with reflector, is coupled to a photomultiplier tube.

Usually a well-type crystal is used. This is a cylindrical crystal with a hole cut into one end, the inner surfaces of which are covered with reflector and aluminium. The sample in a test tube is inserted into this hole. The geometry is very favourable because nearly all the gamma rays emitted by the sample will traverse the crystal.

Most well counters presently in use employ sodium iodide cyrstals 1¾ inch in diameter and 2 inches in height with a well 1½ inches deep and three fourths inches in diameter, the inside diameter of the aluminum well liner being 0.656 inch or 16.5 mm. This well counter is often referred to as the "standard" sodium iodide well counter, however, 2×2 inch and 3×3 inch sodium iodide crystals are also very commonly used.

Whereas gamma radiation has high penetration power, beta radiation and especially low energy beta emitters like tritium and C-14, are easily absorbed within the sample itself. To avoid the problems of self absorption liquid scintillation spectrometers are used.

In the use of liquid scintillation spectrometers the sample is dissolved in liquid scintillator so that the radioactive molecules are in intimate contact with the scintillator. The light pulses resulting from the absorption by the liquid scintillator of the beta particles are then detected with a photomultiplier tube, which is placed in proximity to the sample vial itself.

Heretofore, for a mixture of radioisotopes which could not be counted adequately by gamma ray spectroscopy, beta as well as gamma counting was done in two separate counters. Thus the mixture would be counted in a standard sodium iodide well counter and then because of the inadequacy of said counter for counting beta rays the sample would then be placed in a beta ray counter.

SUMMARY OF THE INVENTION

It has now been found that by coating the surface of the well of an inorganic scintillation crystal type scintillation counter with a light transmitting material instead of with aluminium and light reflective material it is possible to produce a new type of multipurpose alpha-beta-gamma scintillation spectrometer. According to the present invention, there is now provided a scintillation spectrometer comprising an inorganic scintillation crystal said crystal being characterized by a well situated therein wherein the surfaces of said well are coated with a light transmitting material whereby said spectrometer is adapted to measure both beta and gamma emissions of radioactive samples introduced into said well.

The advantages of having a single unit which can serve as both a beta and gamma scintillation counter are apparent and the use of said scintillation counter for said purpose will be described hereinafter with reference to NaI(Tl) as the inorganic scintillation crystal for simplicity sake, however, as will be explained hereinafter instead of NaI(Tl) crystals; CsI(Tl) crystals, CsI(Na) crystals or equivalent inorganic scintillation crystals can be used.

In a preferred embodiment of the present invention there is provided an inorganic scintillation crystal in combination with two photomultiplier tubes coupled to two substantially opposite sides of said crystal wherein said crystal is further characterised by a well situated therein, which well is preferably substantially perpendicular to the major axis of said crystal.

In still another preferred embodiment of the present invention the spectrometer consists of two cylindrical NaI(Tl) crystals each of which has a semi-cylindrical cavity perpendicular to its major axis. The surfaces of the crystals, with the exception of the bases and the surfaces of the semi-cylindrical cavities, are coated with a reflecting substance. The surfaces of the cavities are covered with a thin layer of glass. The bases of the crystals are coupled to two photomultiplier tubes. The two NaI(Tl) crystals face each other in such a way that their cavities form a single cylindrical cavity and vials containing radioactive samples are placed in the cylindrical cavity formed by the two NaI(Tl) crystals.

Brief Description of the Drawings

The invention is illustrated by way of example only, in the accompanying drawings in which.

With specific reference now to the figures in detail it is stressed that the particulars shown are by way of example and for purposes of illustrative discussion only and are presented in the cause of providing what is believed to be the most useful and readily understood description of the principles and conceptual aspects of the invention. In this regard no attempt is made to show structural details of the system and its apparatus in more detail than is necessary for a fundamental understanding of the invention the description taken with the drawings making apparent to those skilled in the art how the several forms of the invention may be embodied in practice.

Figure 1:
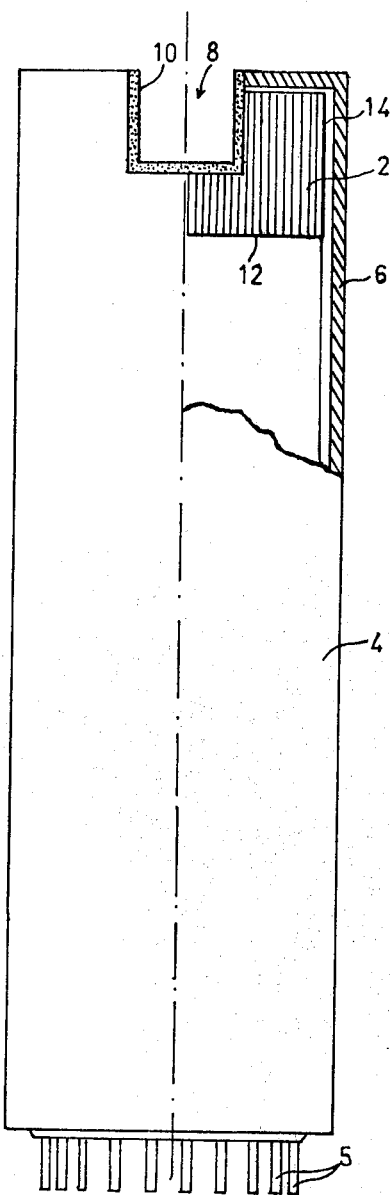
FIG. 1 is a cross-sectional view partially in section of a scintillation well-counter crystal coupled to a photomultiplier tube.

Referring now to FIG. 1 there is shown a standard scintillation welltype scintillation crystal 2 coupled to a photomultiplier tube 4 having electrical contact making pins 5. The crystal and photomultiplier tube are encased in an aluminium housing 6 and the crystal has a central bore or well 8 which is coated on its surfaces by a light-transmitting material, 10, such as glass. The surface of the crystal, with the exception of the base 12 which is coupled to the photomultiplier tube and the well 8, is covered with a reflecting substance 14. As known in the art the photomultiplier tube may also be magnetically shielded.

Figure 2:
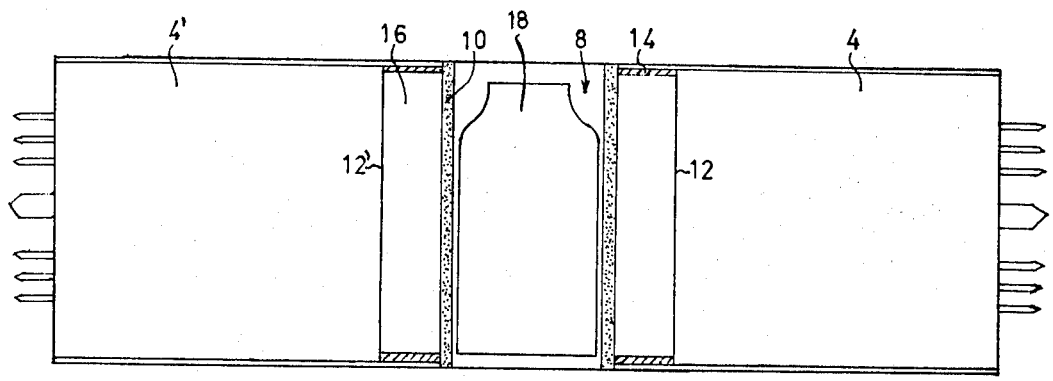
FIG. 2 is a cross-sectional view partially in section of cylindrical inorganic scintillation crystal having a well and coupled to two photomultiplier tubes.

In FIG. 2 there is shown a cross-sectional view of a cylindrical inorganic scintillation crystal 16 having a bore or a cylindrical cavity 8 perpendicular to the major axis of said crystal wherein the two bases 12, 12' of the crystal are coupled to two photomultiplier tubes 4,4'. A vial 18 containing a radioactive sample for measurement is shown as situated in the glass-coated 10 cavity 8.

Figure 4:
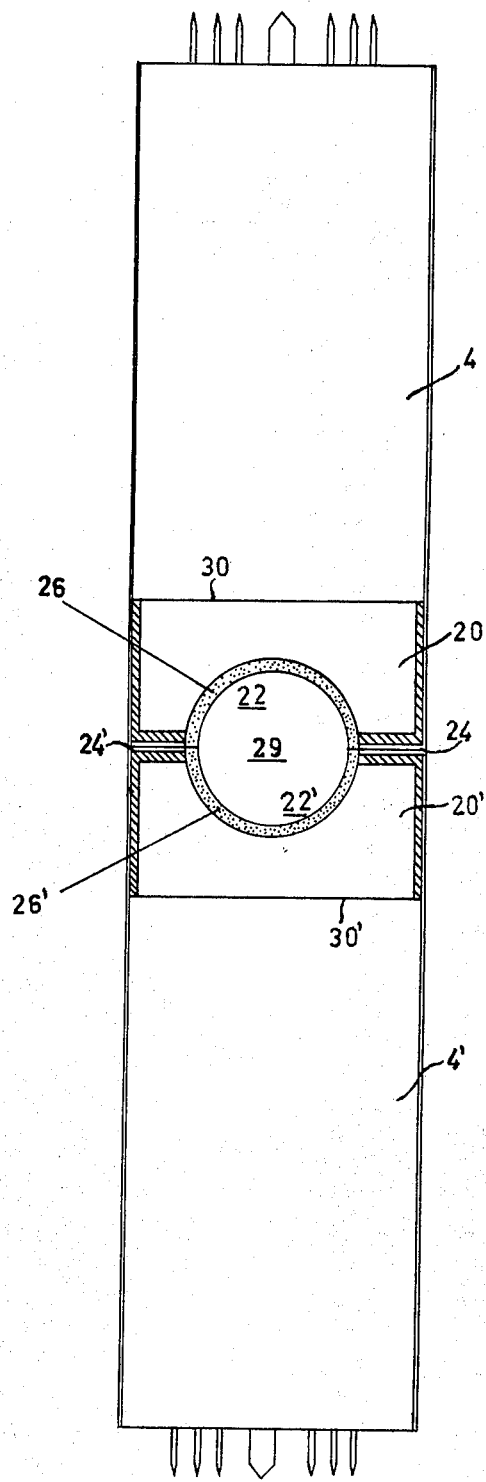
FIG. 4 is a top cross-sectional view of a two crystal scintillation spectrometer.
Figure 3:
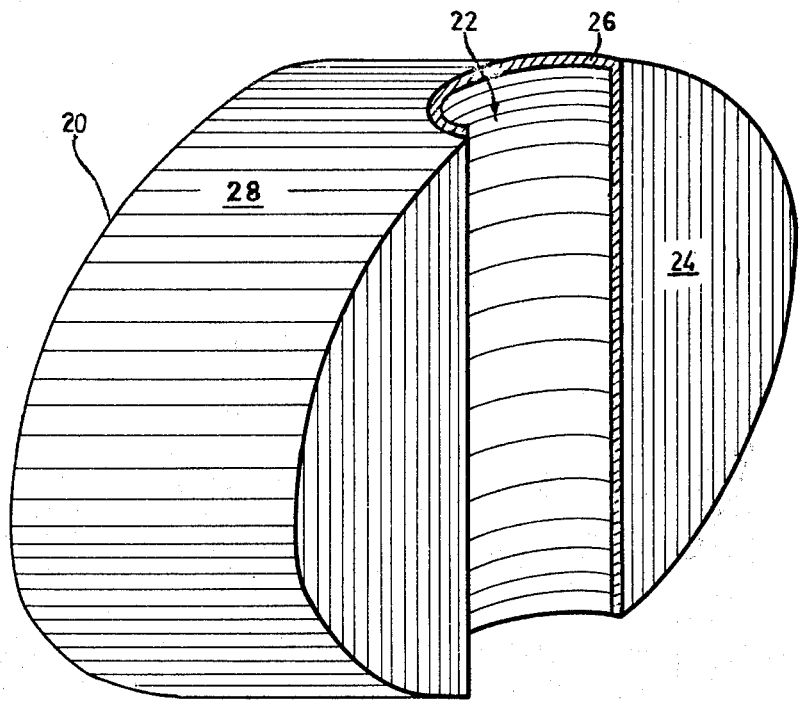
FIG. 3 is a perspective view of a crystal with a semi-cylindrical cavity on one of its surfaces.

A preferred embodiment of the present invention is shown in FIGS. 3 and 4. FIG. 3 illustrates the possible shape of a crystal 20 having a semi-cylindrical cavity 22 on one of its surfaces 24. The inner surface of said cavity is coated with a light-transmitting material 26 while the outer surface 28 and the surface 24 of said crystal are coated with a reflecting substance. Turning now to FIG. 4 there is shown a two-crystal scintillation spectrometer using two crystals of the type illustrated in FIG. 3, comprising two cylindrically shaped inorganic scintillation crystals 20,20' each of which has a semi-cylindrical cavity 22,22' coated with a light-transmitting material 26,26' respectively. The surfaces 24,24' of said respective crystals are adapted for interfacing alignment whereby said cavities 22,22' form a single composite cylindrical cavity 29. Each of said crystals 20,20' is coupled to a photomultiplier tube 4,4'.

Figure 5:
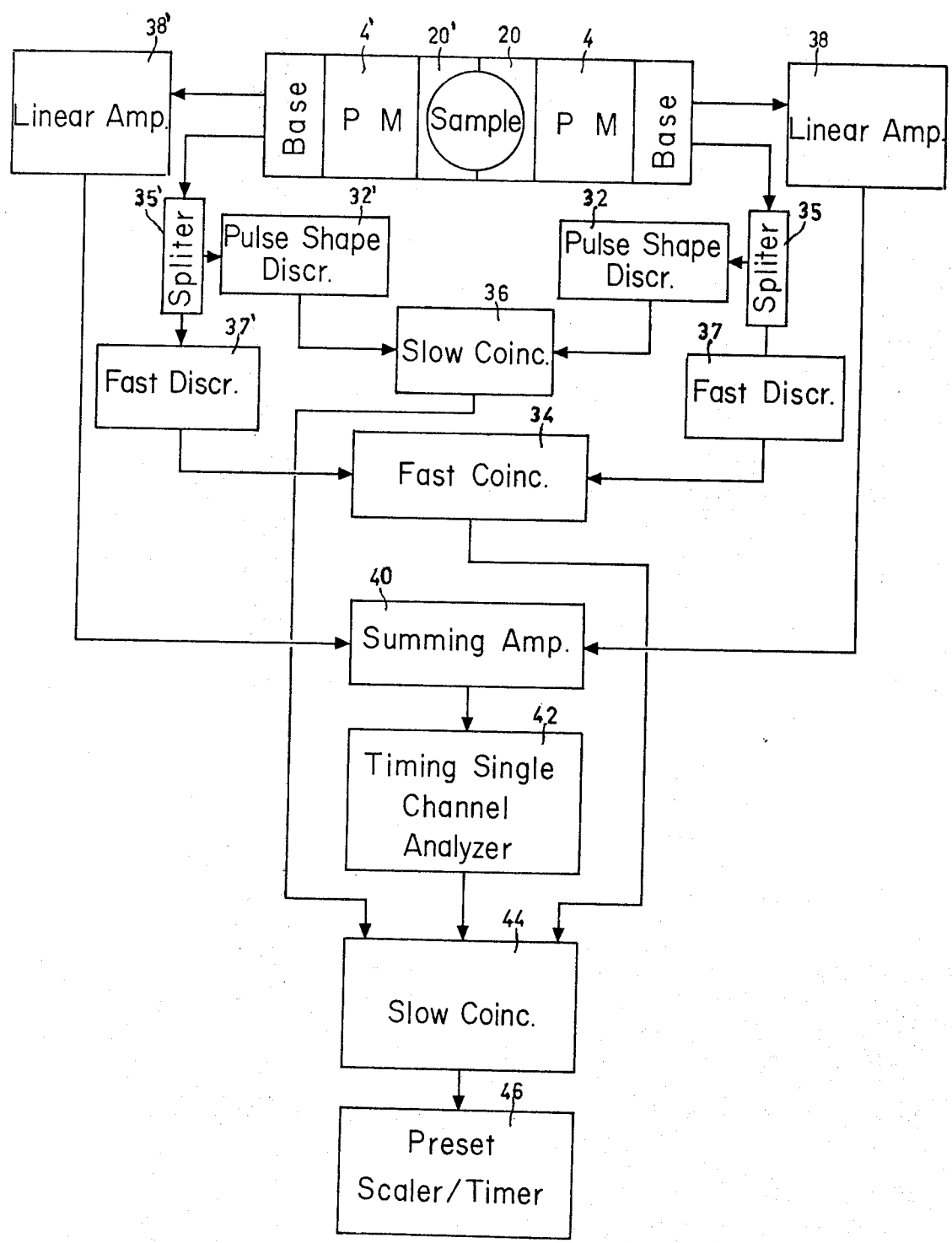
FIG. 5 is an electronic block diagram of a preferred scintillation spectrometer.

In FIG. 5 there is illustrated an electronic block diagram of a preferred scintillation spectrometer and the following description of the operation of such a spectrometer should be read in conjunction with said Figure.

When a sample containing a pure beta emitter is to be measured for example, it is dissolved in a liquid scintillator; the radioactive liquid scintillator is put into a vial and the vial is placed in the cylindrical cavity 29 formed by crystals 20 and 20'. The light emitted from the liquid scintillator when a beta particle interacts with it, is piped through the NaI(Tl) crystals to the two photomultiplier tubes 4 and 4'.

The NaI(Tl) crystals serve not only as light pipes but also as an anti-coincidence shield for reducing background counting rate. When a gamma or a cosmic ray interacts both with the liquid scintillator and the NaI(Tl) crystal, the "false" pulse is not counted. These background pulses are rejected by pulse-shape discriminators 32,32'. The light emitted from the liquid scintillator and the NaI(Tl) crystals reaches the same photomultiplier tubes. However, the pulse shape and the decay time of a pulse which originates in the organic liquid scintillator differs from that which originates in the inorganic NaI(Tl) crystal. Whereas the decay time of the light pulse from a liquid scintillator is about 3 nsec, the decay time of a light pulse from the NaI(Tl) crystal is 250 nsec. By using pulse-shape discriminators it is possible to ascertain the origin of the pulse. The pulse-shape discriminators are set in such a way as to give an output pulse only when fast pulses enter them.

When a beta particle interacts with the liquid scintillator the light emitted is piped to the two photomultiplier tubes, the output pulses of which enter a fast coincidence circuit 34 via splitters 35,35' and fast discriminators 37,37'. These two pulses enter also into the two pulse-shape discriminators 32,32'. The output pulses of the pulse-shape discriminators enter a slow coincidence circuit 36. The two pulses from the photomultiplier tubes after being amplified by linear amplifiers 38,38' are summed by summing amplifier 40, and the summed pulse enters a single channel analyzer 42. The three pulses — the output pulse of the fast coincidence circuit 34, the output pulse of the slow coincidence circuit 36 and the output pulse of the single channel analyzer 42 — enter another slow coincidence circuit 44. The output pulse of this circuit are counted by a scaler, 46.

As mentioned above the NaI(Tl) crystals serve as an anticoincidence shield. This shield is expected to be effective not only for rejecting external gamma radiation and cosmic rays but also for reducing background from inherent radioactive contamination in the photomultiplier tubes and in other components of the detector (including that in the lead or steel shield).

With conventional liquid scintillation spectrometers, light pipes are a source of background pulses. These pulses result from fast electrons which, when interacting with the light pipe, produce Cerenkov light radiation. Due to this, only thin light pipes are used in conventional liquid scintillation spectrometers.

With the proposed spectrometer this problem does not exist. Pulses which originate from electrons interacting with the NaI(Tl) light-pipes are rejected by the pulse-shape discriminators.

When a gamma emitting sample is to be measured it is placed in a vial and the NaI(Tl) crystals serve as a close to $4\pi$ gamma counter. The pulses from the NaI(Tl) crystals are added; the added pulses pass through the single channel analyzer and are counted.

A radioisotope which simultaneously emits a beta particle and a gamma photon can be counted by applying a further coincidence circuit. With this procedure the sample is dissolved in a liquid scintillator. The fast component of the output pulse from the liquid scintillator passes through a single channel analyzer; the slow component from the NaI(Tl) crystal passes through another single channel analyzer. The "windows" of the two single channel analyzers are set to fit the corresponding energies of the gamma photon and the beta particle. When the output pulses of the two single channel analyzers are in coincidence a count is recorded. With this mode of operation the background counting rate is expected to be negligible — an important factor in low level counting. Another advantage of operating the spectrometer in this way is the ability to count doubly-labelled samples. When a sample contains two or more radioisotopes determining the activity of each of them is rather difficult because of (1) the Compton background in the case of a gamma emitter and (2) the broad energy band in the case of a beta emitter. An isotope which emits a beta particle and a gamma photon simultaneously can be counted by the above-described coincidence method even if mixed with another beta or gamma emitting radioisotope.

Samples emitting alpha radiation can be measured by dissolving them in a liquid scintillator and counting them in the same way as beta emitters.

It should be noted that:

NaI(Tl) is transparent to light emitted from liquid scintillators. The light emitted by both types of scintillators is in the range of 3,500–5,500 A (Maximum emission of NaI(Tl) is at 4,130 A and that of liquid scintillators at 4,250A). As mentioned above instead of using NaI(Te) crystals, CsI(Tl) crystals may be used. The decay time of a light pulse from these crystals is 1,100 nsec, an advantage in pulse-shape discrimination. The light output of these crystals is 95% of anthrancene (as compared with 210% for NaI(Tl) and 78% for liquid scintillators). This lower light output is an advantage when a high ratio between the fast component and the slow component of a pulse is desired. (The slow decay time is also an advantage from this point of view). Gamma photons are more readily detected with CsI(Tl) crystal than with a NaI(Tl) crystal because of the high atomic number of Cs. This too, of course, is an advantage. From similar considerations CsI(Na) crystals, too, are a very attractive possibility.

To illustrate the way the spectrometer will perform an example of the detection of a beta-pulse emitter will be described as follows:

Nitrogen-13 is a beta-plus emitter. It is a short lived radioisotope (Half life of about 10 minutes) which decays by emitting a 1.2 Mev positron.

When a sample tagged with N-13 is to be measured, it is dissolved in a liquid scintillator. A vial containing the radioactive solution is inserted into the cylindrical cavity formed by, for example, two CsI(Tl) crystals.

When a N-13 atom disintegrates the emitted positron is absorbed in the liquid scintillator. By annihilation, two 0.51 Mev photons are emitted in two opposite directions and interact with the two CsI(Tl) crystals.

The interaction of the positron with the liquid scintillator creates a fast-decaying light pulse. The light photons reach both of the P.M. tubes.

The interaction of the gamma photons with the CsI(Tl) crystals creates slow decaying light pulses.

As all these interactions are practically simultaneous, the result is that there are two output pulses from the two P.M. tubes in coincidence. The output pulses each has a fast component and a slow one. Each of these pulses are resolved into two pulses, a fast pulse, and a slow one, by a suitable electronic circuit. The four pulses pass through single channel analyzers. Only when the four pulses are in coincidence and all of them have the right energies, a count will be recorded.

It is expected that the background counting rate will be less than one count per day and that the counting efficiency will be better than 60 percent. In this way even if the sample contains only very few N-13 atoms, the activity will be detected even if the sample contains other isotopes with activities for exceeding that of N-13.

It will be evident to those skilled in the art that the invention is not limited to the details of the foregoing illustrative embodiments and that the present invention may be embodied in other specific froms without departing from the spirit or essential attributes thereof.

For example instead of glass, quartz, silica or some equivalent light transmitting material can be used to coat the inner surfaces of the well. Similarly crystals of different sizes and cavities of different sizes may be used according to applications intended. 2 inch diameter crystals up to 5 inch diameter ones coupled to suitable photomultiplier tubes will usually be used. It is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A scintillation spectrometer comprising an inorganic scintillation crystal, said crystal being characterized by a well situated therein wherein the inner surfaces of said well are coated with a light transmitting material whereby said spectrometer is adapted to measure both beta and gamma emissions of radioactive samples introduced into said well.

2. A scintillation spectrometer according to claim 1 wherein said crystal is cylindrical in shape and has a well situated along its major axis the inner surfaces of said well being coated with a light transmitting material and the base of said crystal being coupled to a photomultiplier tube.

3. A scintillation spectrometer according to claim 1 comprising a cylindrical inorganic scintillation crystal having a bore hole substantially perpendicular to the major axis of said crystal wherein the two bases of said cylindrical crystal are coupled to two photomultiplier tubes and wherein the inner surface of said bore hole is coated with a light transmitting material while the other surfaces of said crystal are coated with a reflector.

4. A scintillation spectrometer according to claim 3 especially adapted for measuring radioisotopes emitting beta and gamma radiation simultaneously said spectrometer further comprising electronic circuits which select only those events in which the fast components and the slow components of the output pulses of the two photomultiplier tubes are in coincidence and have preselected pulse heights.

5. A scintillation spectrometer according to claim 1 further comprising pulse shape discriminators for measuring beta samples dissolved in liquid scintillators.

6. A scintillation spectrometer according to claim 1 wherein said crystal is an NaI(Tl) crystal.

7. A scintillation spectrometer according to claim 1 wherein said crystal is a CsI(Tl) crystal.

8. A scintillation spectrometer according to claim 1 wherein said light transmitting material is glass.

9. A scintillation spectrometer according to claim 1 wherein said inorganic scintillation crystal is a composite crystal comprising two crystals each of which has a semi-cylindrical cavity on one of its surfaces said surfaces being adapted for interfacing alignment whereby said cavities form a single cylindrical cavity.

10. A scintillation spectrometer according to claim 9 comprising two cylindrical inorganic scintillation crystals each of which has a semicylindrical cavity perpendicular to its major axis, the surfaces of which cavities are coated with a thin layer of glass and wherein each of said crystals has a base opposite its respective cavity coupled to a photomultiplier tube.

11. A scintillation spectrometer according to claim 9 wherein said crystal in an NaI(Tl) crystal.

* * * * *